United States Patent [19]

Wheeler

[11] Patent Number: 5,395,054
[45] Date of Patent: Mar. 7, 1995

[54] FLUID AND AIR HOSE SYSTEM FOR HAND HELD PAINT SPRAY GUN

[75] Inventor: Roger D. Wheeler, Holland, Ohio

[73] Assignee: Ransburg Corporation, Indianapolis, Ind.

[21] Appl. No.: 210,959

[22] Filed: Mar. 21, 1994

[51] Int. Cl.⁶ ............................................... B05B 7/02
[52] U.S. Cl. ................................... 239/526; 239/290; 248/231.8; 403/378; 403/389
[58] Field of Search ............... 239/525, 526, 527, 290; 248/75, 74.2, 231.8, 301; 403/389, 390, 391, 396, 399, 377, 378

[56] References Cited

U.S. PATENT DOCUMENTS

| D. 281,393 | 11/1985 | Karnhag et al. | D8/373 |
|---|---|---|---|
| D. 295,724 | 5/1988 | Shioda | D8/396 |
| 351,941 | 11/1886 | Simmons . | |
| 470,776 | 3/1892 | Beehler . | |
| 978,398 | 12/1910 | Rischard . | |
| 1,816,301 | 7/1931 | Sundell | 403/391 |
| 1,982,501 | 11/1934 | Douglas | 403/391 |
| 2,199,110 | 4/1940 | Metz | 239/413 |
| 3,002,695 | 10/1961 | Matthewson | 239/525 |
| 3,159,348 | 12/1964 | Wedan | 239/290 |
| 3,166,252 | 1/1965 | O'Brien et al. | 239/587 |
| 3,270,966 | 9/1966 | Ackley | 239/550 |
| 3,412,760 | 11/1968 | Franck | 138/96 |
| 3,522,909 | 8/1970 | Arant | 239/304 |
| 3,675,275 | 7/1972 | Arblaster | 248/75 |
| 4,005,825 | 2/1977 | Schowiak | 239/526 |
| 4,405,251 | 9/1983 | Kolchinsky et al. | 403/377 |
| 4,407,472 | 10/1983 | Beck | 248/89 |
| 4,832,269 | 5/1989 | Carroll et al. | 242/25 R |
| 5,027,478 | 7/1991 | Suhr | 24/16 R |
| 5,056,719 | 10/1991 | Lauter et al. | 239/526 |
| 5,221,154 | 6/1993 | Foulquier et al. | 403/377 |
| 5,236,129 | 8/1993 | Grime et al. | 239/526 |

FOREIGN PATENT DOCUMENTS

| 914351 | 7/1949 | Germany | 239/290 |
|---|---|---|---|
| 9013752 | 11/1990 | WIPO | 403/378 |

Primary Examiner—Andres Kashnikow
Assistant Examiner—Christopher G. Trainor
Attorney, Agent, or Firm—MacMillan, Sobanski & Todd

[57] ABSTRACT

Light weight fluid and compressed air supply hoses are attached to a hand held paint spray gun. The heavier air hose is attached through a swivel fitting to permit the gun to rotate relative to the air hose. One or more generally e-shaped clips secured along the air hose retain the smaller fluid hose next to the air hose, while permitting the fluid hose to move in an axial direction relative to the air hose without kinking as the spray gun is manipulated during use. The light weight fluid hose is attached through fittings to a heavier fluid supply hose. An S-shaped clip supports the fluid hose fitting from the air hose to relieve stress on the end of the light weight fluid hose.

10 Claims, 2 Drawing Sheets

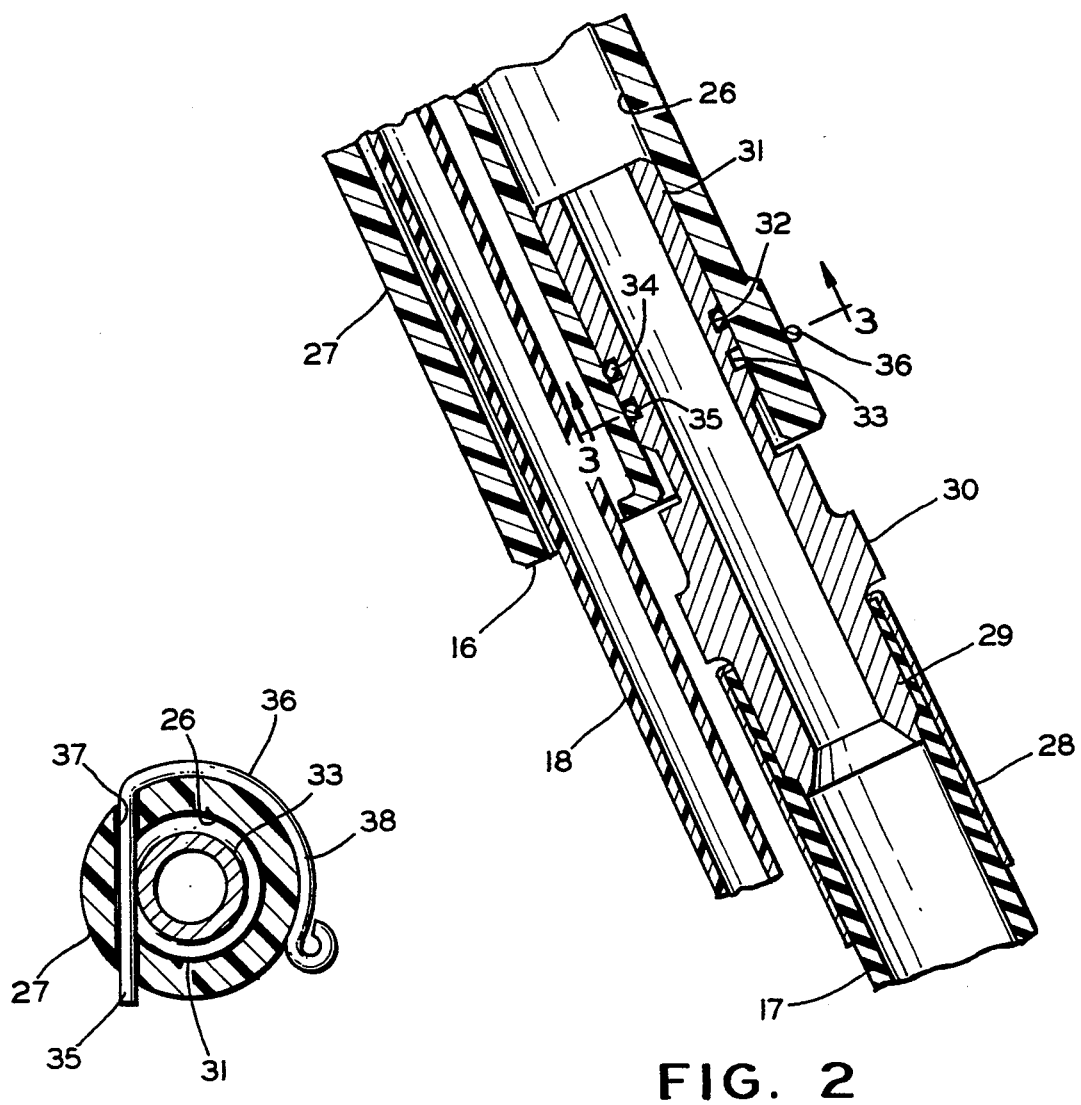
FIG. 2
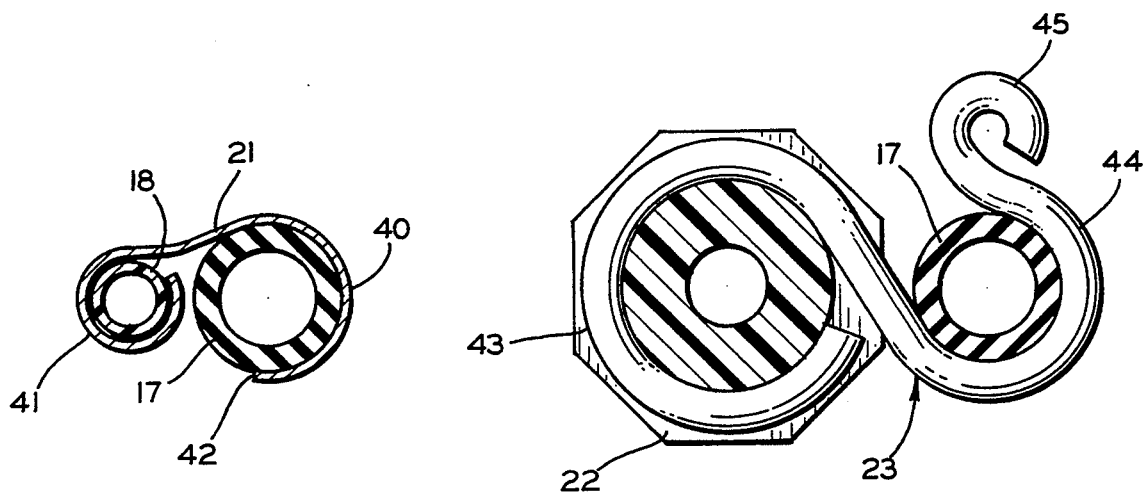
FIG. 3
FIG. 4
FIG. 5

5,395,054

FLUID AND AIR HOSE SYSTEM FOR HAND HELD PAINT SPRAY GUN

TECHNICAL FIELD

The invention relates to hand held paint spray guns and more particularly to an improved system for managing a fluid hose and an air hose connected to a handle of a hand held paint spray gun.

BACKGROUND ART

Conventional hand held paint spray guns are used by an operator grasping a handle and manually operating a trigger. Typically, compressed air is delivered through a hose connected to an end of the gun handle. For large commercial applications where the paint color and type are not frequently changed, the paint or fluid being sprayed is supplied to the gun through a hose which also is attached to the spray gun handle next to the air supply hose. By attaching the air and fluid hose to the gun handle next to the operator's hand rather than to the gun body, torsional forces on the operator's wrist which can increase operator fatigue are minimized. However, the two hoses can interfere with the mobility of the spray gun as the operator sweeps the gun over the surfaces being painted. If the hoses remain separate, they can become tangled and interfere with the spraying operation. On the other hand, if the two hoses are formed as an integral unit or are permanently connected together, they become stiff and greater operator effort is required to aim the gun in different directions.

A further problem can occur with kinking of the fluid hose when the fluid and air hoses are connected together. In order to minimize operator fatigue, it is desirable to make both hoses as small and light weight as possible adjacent the spray gun. Since the air hose must carry compressed air without bursting, it must be made considerably heavier than the fluid hose. If the light weight fluid hose and the heavier air hose are permanently connected together, the fluid hose will tend to kink if the spray gun is moved in a direction which places axially compressive forces on the fluid hose.

DISCLOSURE OF INVENTION

According to the invention, an improved system is provided for connecting together a paint and air hose which are attached to a hand held paint spray gun. At the spray gun, the air hose is much heavier than the fluid hose to withstand higher internal air pressures and to prevent bursting from abrasion. However, both the air hose and the fluid hose may be kept as light weight as possible at the gun to minimize operator fatigue. The light weight hoses extending from the spray gun may be connected a short distance from the gun to heavier hoses which are resistant to abrasion and damage as they are dragged over the floor, stepped on, etc.

A swivel connection is formed between the air hose and the spray gun handle to permit the spray gun to rotate relative to the air hose. Two or more generally e-shaped clips are secured to and spaced apart on the air hose. The clips tightly engage and do not rotate on the air hose. Each clip forms a loop through which the fluid hose passes. The clips retain the fluid hose next to the air hose, while permitting the fluid hose to freely move in an axial direction to prevent kinking from axially directed forces on the fluid hose.

Preferably, the section of fluid hose attached to the spray gun is shorter than the section of air hose attached to the gun. Both the fluid hose and the air hose terminate at fittings for attaching the hoses to heavier fluid and air supply hoses. An S-shaped clip may be snapped onto the air hose and engage and support the fluid hose fitting for eliminating strain on the light weight fluid hose in the vicinity of the fitting.

Accordingly, it is an object of the invention to provide a system for connecting together a paint hose and an air hose which are attached to a hand held paint spray gun without interfering with mobility of the spray gun.

Other objects and advantages of the invention will become apparent from the following detailed description of the invention and the accompanying drawings.

BRIEF DESCRIPTION OF THE DRAWINGS

FIG. 2 is an enlarged cross sectional view showing details of the swivel connection between the air hose and the spray gun handle;

FIG. 3 is a cross sectional view taken along line 3—3 of FIG. 2 showing details of the swivel connection between the air hose fitting and the spray gun handle;

FIG. 4 is a cross sectional view taken along line 4—4 of FIG. 1 showing details of the e-shaped clip which holds the fluid hose next to the air hose; and FIG. 5 is an enlarged cross sectional view taken along line 5—5 of FIG. 1 showing details of the S shaped clip which secures the fluid hose fittings to the air hose.

BEST MODE FOR CARRYING OUT THE INVENTION

Figure 1:
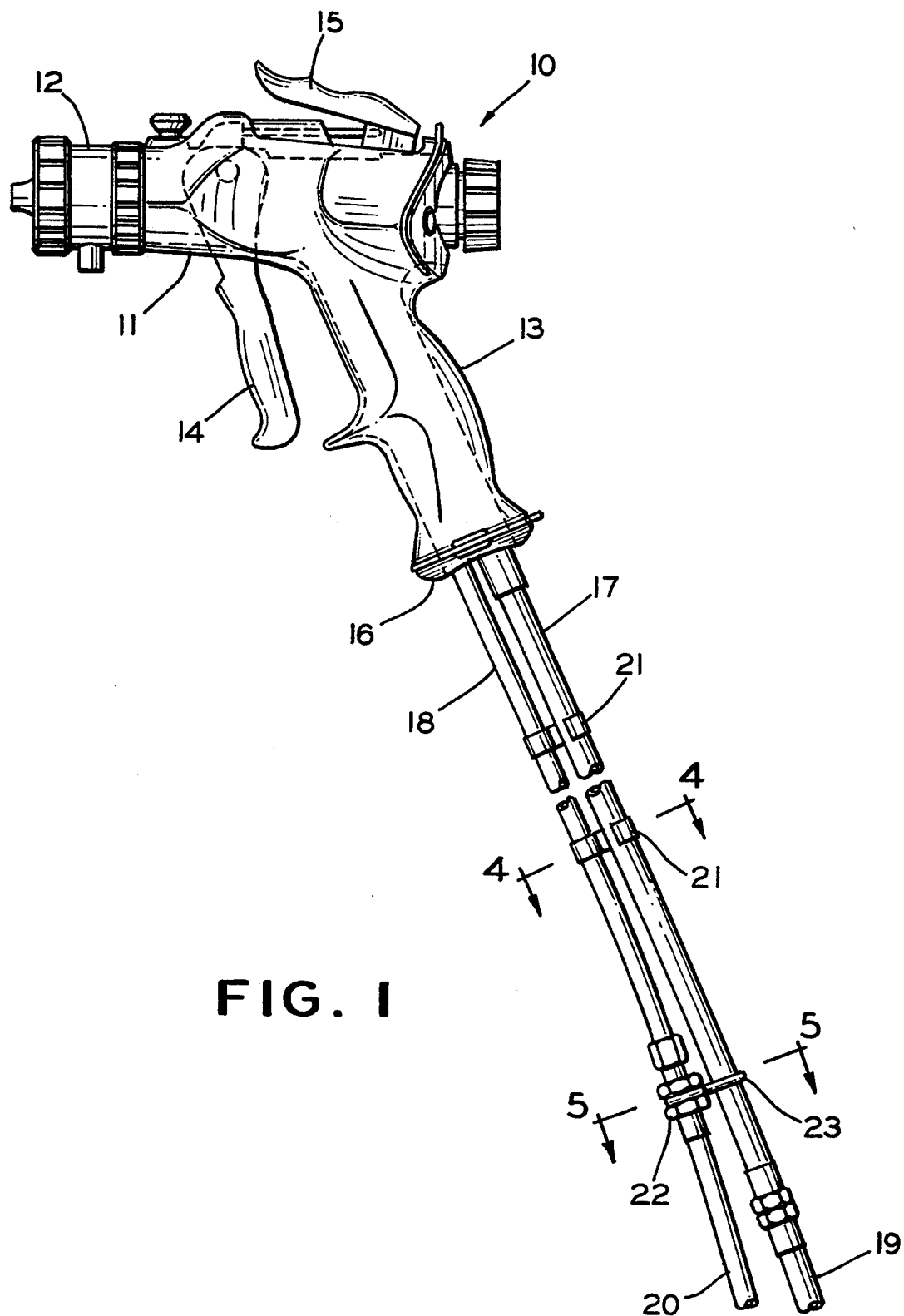
FIG. 1 is a side elevational view of a hand held paint spray gun having attached fluid and air supply hoses connected according to the invention.

Referring to FIG. 1 of the drawings, a hand held paint spray gun 10 is illustrated. The spray gun 10 includes a body 11 terminating at a nozzle assembly 12 which discharges and atomizes paint. A handle 13 depends from the body 11 for holding the gun 10 during use. A trigger 14 which pivots on the body 11 extends adjacent the handle 13 for operating the gun 10. Optionally, an auxiliary trigger 15 may be located above the body 11 to permit operating the gun 10 while grasping the body 11 rather than the handle when spraying in a downward direction. The gun handle 13 has a free end 16. A compressed air supply hose 17 and a fluid supply hose 18 extend from the free handle end 16.

Preferably, the spray gun 10 has an ergonomic design to minimize operator fatigue during extended use. Operator fatigue is further reduced by minimizing the weight of the air hose 17 and the fluid hose 18 on the gun 10. Thus, short light weight hoses 17 and 18 are attached to the gun 10. The hoses 17 and 18 may be a short as one meter or less or may be several meters long. The hoses 17 and 18 are then connected to heavier air and fluid hoses 19 and 20, respectively, which will withstand abuse when, for example, dragged over a floor or stepped on by the operator. The fluid hose 18 may, for example, be a thin walled small diameter nylon tube, since it is not subject to high fluid pressure. The fluid hose may extend through passages (not shown) in the spray gun 10 and connect directly to the nozzle assembly 12. The air hose 17 must be sufficiently strong to withstand the higher pressure of the compressed air and must have a larger inside diameter to carry the required air volume.

Since the air hose 17 will be relatively stiff as compared to the smaller fluid hose 18, it is preferable to form a swivel connection between the air hose 17 and the spray gun handle 13 to permit the spray gun 10 to rotate relative to the air hose 17. The swivel connection to the air hose 17 reduces the operator effort required to move the gun to the left and right. On viewing the side elevational view of FIG. 1, it will be seen that the fluid supply hose 18 will tend to move in an axial upward direction relative to the air hose 17 when the spray gun 10 is pivoted to spray in an upward direction. Similarly, the fluid supply hose 18 will tend to move in an axial downward direction relative to the stiffer air hose 17 when the spray gun 10 is pivoted to spray in a downward direction. When air and fluid hoses have previously been connected together, they have not been free to move in an axial direction relative to each other. Consequently, the hoses had to be made heavier than would otherwise be necessary to prevent kinking and greater operator effort was required over that required for a spray gun where the hoses not connected together.

According to one aspect of the invention, one or more e-shaped clips 21 connect the small fluid hose 18 to the heavier air hose 17. The actual number of clips 21 used to interconnect the hoses 17 and 18 will depend on the lengths of the hoses 17 and 18 and on the strength of the small diameter fluid hose 18. If, for example, the fluid hose 18 is about one meter long, three clips 21 may be adequate for connecting the hoses 17 and 18. The clips 21 keep the hoses 17 and 18 together, while permitting the fluid hose 18 to move in an axial direction relative to the air hose 17. Consequently, operator effort when aiming the spray gun 10 upwardly or downwardly is at a minimum and the possibility of kinking the fluid hose 18 is reduced. The fluid hose 18 is further protected by making the fluid hose 18 shorter than the air hose 17. The light weight fluid hose 18 is connected at firings 22 to the heavier fluid hose 20. An S-shaped clip 23 supports the firings 22 from the air hose 18 to reduce stress on the fluid hose 18.

FIGS. 2 and 3 show details of the swivel connection between the air hose 17 and a passage 26 in an interior frame 27 for the gun handle 13. A crimped tube 28 secures the air hose 17 to an end 29 of an end firing 30. The fitting 30 has a free end 31 which slides into the passage 26. Two spaced annular grooves 32 and 33 are formed around the perimeter of the end 31. An 0-ring 34 is located in the groove 32 to form a gas tight seal between the fitting end 31 and the passage 26, while permitting the firing end 31 to rotate in the passage 26. An end 35 of a spring clip 36 is inserted through a hole 37 in the frame 27. The hole 37 aligns with the firing groove 33 so that the spring clip end 35 passes through the groove 33 and retains the firing end 31 in the frame passage 26. Because the firing groove 33 is annular and extends around the fitting end 31, the firing 30 is free to rotate relative to the handle frame 27. The spring clip 36 has an end 38 which is shaped to extend at least partially around the handle frame 27 to retain the clip end 35 in the hole 37.

FIG. 4 shows details of the e-shaped clip 21. Preferably, the clip 21 is formed from a flat spring steel. However, it will be appreciated that the clip 21 may be made from other resilient materials such as a plastic. The clip 21 has two interconnected loops 40 and 41. The larger loop 40 is open at an end 42 sufficiently to permit inserting the air hose 17 into the loop 40. The loop 40 has a smaller diameter than the outside diameter of the air hose 17 so that the clip 21 resiliently engages and does not easily rotate on the air hose 17. The fluid hose 18 passes through the smaller loop 41. The loop 41 has an inside diameter slightly greater than the outside diameter of the fluid hose 18 and the loop 41 is sufficiently closed to trap the fluid hose 18. Thus, the clip 21 retains the fluid hose 18 next to the air hose 17, while permitting the fluid hose 18 to move in an axial direction relative to the air hose 17. Although the clip 21 is shown as having a generally e-shape, it will be appreciated that it may be formed to have an S-shape and still serve its desired function.

As stated above, the fittings 22 connecting the free end of the fluid hose 18 to the fluid supply hose 20 are supported from the air hose 17 by the S-shaped clip 23, which is shown in detail in FIG. 5. The clip 23 may be formed from wire and shaped to form two interconnected loops, a larger closed loop 43 and a smaller open loop 44. The larger loop 43 is sized to be trapped between the fittings 22 connecting the fluid hoses 18 and 20. The smaller open loop 44, which terminates at a rounded end 45, is sized with an inside diameter slightly smaller than the outside diameter of the air hose 17. Thus, the resilient air hose 17 may be pushed into the smaller loop 44 without damage and will be retained in the loop 44 to support the weight of the fluid hose fittings 22.

It will be appreciated that various modifications and changes may be made to the above described preferred embodiment of a fluid and air hose system for a hand held paint spray gun without departing from the spirit and the scope of the following claims. If the fluid hose 18 is a highly flexible small diameter tube, it may be desirable to use a known type of strain relief (not shown) where the hose 18 enters the spray gun handle 13 to further reduce the risk of the fluid hose 18 kinking adjacent the gun handle end 16. The strain relief may, for example, consist of a short section of a larger diameter resilient tube positioned over the hose 18 or consist of a helical spring wound around the hose 18 adjacent the handle end 16.

I claim:

1. In combination with a hand held paint spray gun having a handle, an air hose extending from said handle and a fluid hose extending from said handle, at least one first clip secured to said air hose a predetermined distance from said handle, said first clip defining a first loop having an inside diameter larger than an outside diameter of said fluid hose and a second loop engaging said air hose, and wherein said fluid hose is passed through said first clip loop and said air hose is passed through said second clip loop, said first clip retaining said fluid hose next to said air hose without restraining said fluid hose from axial movement through said first loop.

2. A spray gun as set forth in claim 1, and wherein said second loop has an inside diameter smaller than an outside diameter of said air hose and having an opening through which said air hose may be passed, and wherein said air hose is compressed in said second loop to secure said clip on said air hose.

3. A spray gun as set forth in claim 2, and wherein said at least one first clip is e-shaped.

4. A spray gun as set forth in claim 2, and wherein a plurality of said first clips are secured to said air hose, said first clips retaining said fluid hose next to said air hose at spaced locations along said air hose.

5. A spray gun as set forth in claim 4, and further including a fitting connecting said fluid hose to a heavier fluid supply hose, and a second clip securing said fitting to said air hose.

6. A spray gun as set forth in claim 5, and wherein said second clip securing said fitting to said air hose is S-shaped.

7. A spray gun as set forth in claim 4, and further including a fitting secured to said air hose at said gun, and means retaining said air hose fitting in a passage in said spray gun handle while permitting said air hose fitting to rotate in said passage.

8. A spray gun as set forth in claim 5, wherein said air hose fitting has an end portion which is received by said spray gun handle passage, said end portion having first and second spaced annular grooves extending about its periphery, an 0-ring seal retained in said first groove and wherein said retaining means comprises a third clip having an end portion extending through a hole in said spray gun handle, said third clip end portion passing through said second groove to retain said air hose fitting end in said handle passage.

9. A spray gun as set forth in claim 1, and further including a fitting secured to said air hose at said gun, and means retaining said air hose fitting in a passage in said spray gun handle while permitting said air hose fitting to rotate in said passage.

10. A spray gun as set forth in claim 9, wherein said air hose fitting has an end portion which is received by said spray gun handle passage, said end portion having first and second spaced annular grooves extending about its periphery, an 0-ring seal retained in said first groove and wherein said retaining means comprises a second clip having an end portion extending through a hole in said spray gun handle, said second clip end portion passing through said second groove to retain said air hose fitting end in said handle passage.

* * * * *